(No Model.) 2 Sheets—Sheet 1.
G. W. KRAMER.
STEERING GEAR FOR TRACTION ENGINES.

No. 502,230. Patented July 25, 1893.

Witnesses:
Joseph H. Nelson
A. L. Rhinehart

Inventor:
George W. Kramer
By Hill & Hill
his Attys.

(No Model.) 2 Sheets—Sheet 2.
G. W. KRAMER.
STEERING GEAR FOR TRACTION ENGINES.
No. 502,230. Patented July 25, 1893.
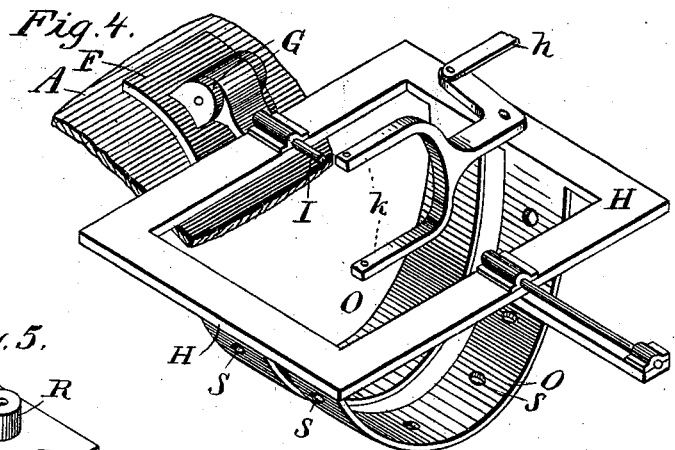
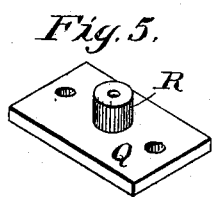
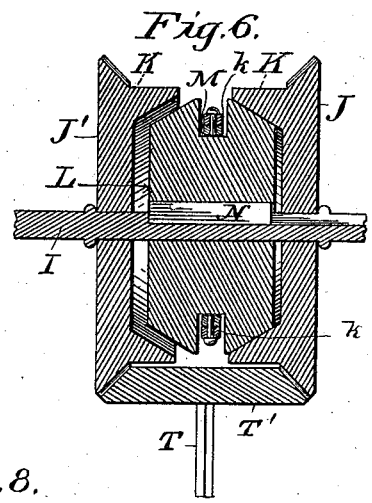
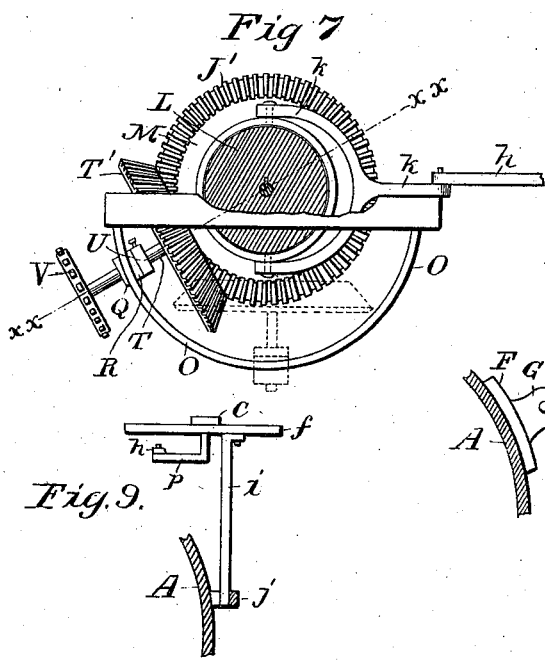
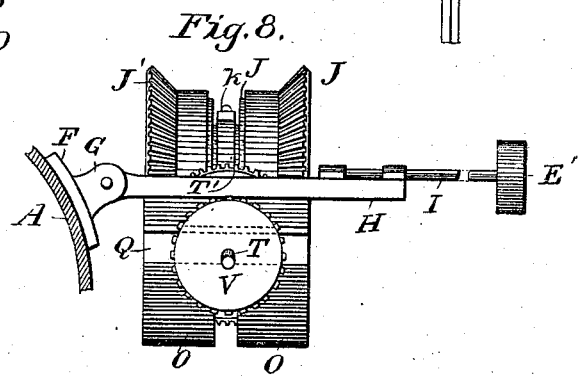
Witnesses:
Joseph H. Nelson
A. L. Rhinehart
Inventor:
George W. Kramer
By Nice & Nice
his Attys

UNITED STATES PATENT OFFICE.

GEORGE W. KRAMER, OF PEORIA, ILLINOIS, ASSIGNOR TO THE HART WEIGHER COMPANY, OF SAME PLACE.

STEERING-GEAR FOR TRACTION-ENGINES.

SPECIFICATION forming part of Letters Patent No. 502,230, dated July 25, 1893.

Application filed April 7, 1892. Serial No. 428,242. (No model.)

*To all whom it may concern:*

Be it known that I, GEORGE W. KRAMER, a citizen of the United States, residing at Peoria, in the county of Peoria and State of Illinois, have invented certain new and useful Improvements in Steering-Gear for Traction-Engines; and I do hereby declare the following to be a full, clear, and exact description of the invention, such as will enable others skilled in the art to which it appertains to make and use the same.

This invention relates to improvements in steering gear for traction engines.

The object of the invention is to provide a gearing with which to guide the front wheels of a traction engine, and also the object is to provide power to accomplish this end from the same power used to propel the engine.

Figure 1:
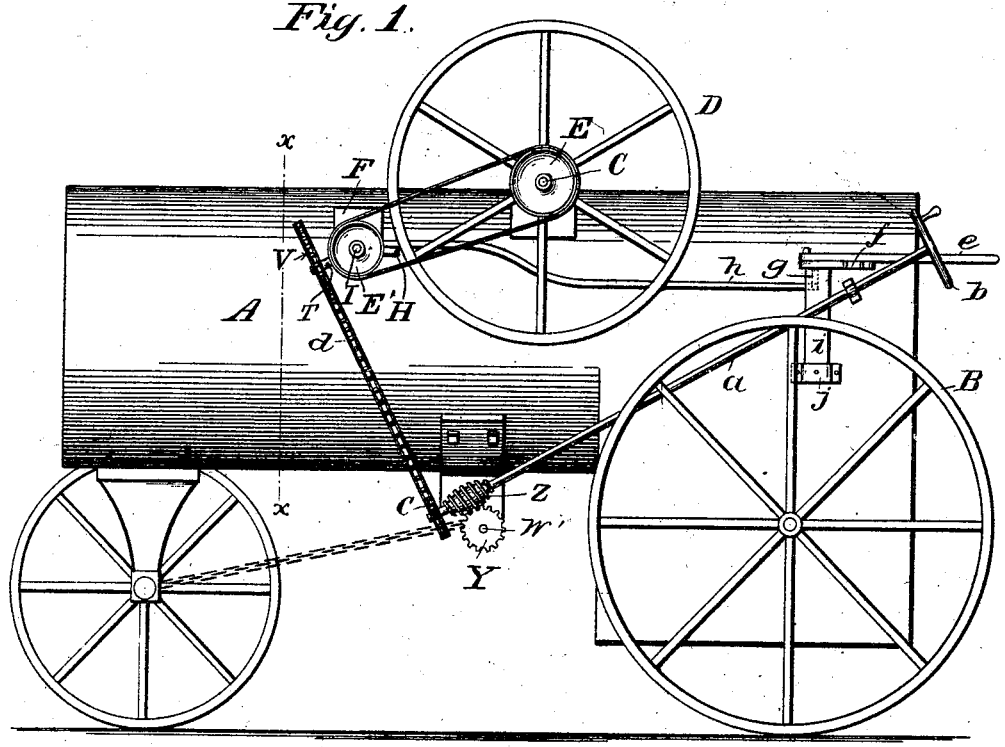
Figure 2:
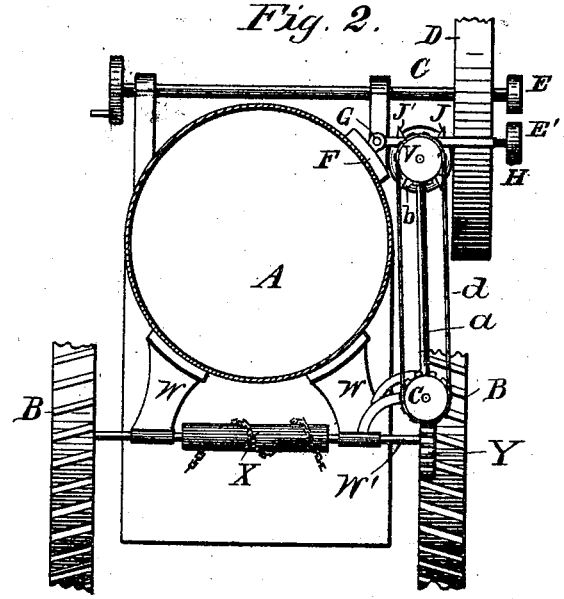
Figure 3:
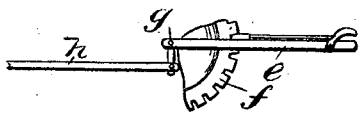

In the drawings hereto annexed, Figure 1 represents a side elevation of the engine showing my invention applied thereto. Fig. 2 represents a sectional elevation through dotted line *x x* Fig. 1. Fig. 3 is a perspective view of a shifting lever showing connection with a shifting fork. Fig. 4 is a perspective view of a frame used to mount the gearing on and which is designed to be mounted on the boiler. Fig. 5 is a perspective view of an adjustable bearing plate. Fig. 6 is a cross sectional view of the gearing shown removed from the frame (through dotted line *x x x x* Fig. 7.) Fig. 7 is an end view of the gearing showing one wheel removed therefrom and showing part section. Fig. 8 is a side view of the frame and gearing showing same mounted on the boiler. Fig. 9 is an end elevation of the lever and its parts mounted on a standard attached to the boiler.

A represents the boiler, and B B the carrying wheels. On the top of the boiler are mounted the usual shaft and its belt pulley C and D respectively; the shaft having connection with the engine as usual (not shown). To the said shaft outside the pulley D is secured a belt pulley E for the purpose hereinafter stated. A bracket F, with one or more ears G cast therewith to suit the requirements, is bolted to the boiler and pivotally hung from this bracket by means of said ears G, is a rectangular frame H on which is journaled a shaft I, the said shaft I occupying a position parallel to the said shaft C, and loosely mounted on the shaft I, and facing each other are two beveled gear wheels J and J', each of which is provided on its inner face with an annular flange K K. Between these wheels and mounted on the said shaft I is a friction bowl which is simply a circular block of wood or metal of the required thickness having a groove M turned in the center of the periphery thereof and from this groove outward, the metal is turned off leaving a tapering surface on either side, and the inner faces of the flanges K K are turned out to fit and receive the said bowl L as shown. The bowl is allowed to shift on the shaft I laterally to properly do its work and to prevent its turning on the shaft, a key N is secured to the shaft I and a keyway is made in the bowl so that the said bowl may easily shift backward and forward on the shaft and yet turn with it. This construction forms a most efficient friction clutch and the purpose of which will be hereinafter set forth.

It is obvious that it does not matter how the friction-bowl is caused to revolve with the shaft, as, for example, the shaft may be non-circular or squared, and the bowl fit thereon, or the bowl may be permanently secured to the shaft, and the shaft and bowl be moved together. Hence I do not wish to be understood as limiting myself to the feathered connection above described.

Made with the said rectangular frame H and depending therefrom are two semi-circular portions O O which are placed at right angles with the shaft I. The said portions are placed a short distance apart leaving a space P between them and a plate Q with a bearing lug R (Fig. 5) may be secured to the semi-circular portions O O by means of bolts or the like and made adjustable thereon by means of the holes S S. Through the bearing lug R, of the plate Q, is placed a shaft T bearing on one end a beveled gear wheel T' which engages with the wheels J and J' and a collar U is placed on the said shaft which bears against the lug R and thus keeps the shaft in its proper position. The lower end of the shaft T is provided with a sprocket wheel V for the purposes to be described. To the under portion of the boiler are bolted the usual boxings W W for the shaft W' and "take up" drum X, and the outer end of said shaft is provided with the usual gear wheel Y which meshes with the worm gear Z mounted on the slanting shaft a, journaled to the side of the boiler. This shaft carries on its rearward end the hand wheel b and the lower forward end carries a sprocket wheel c which is in a direct line with the sprocket wheel V above mentioned, and a sprocket chain d is provided to form a belt between these wheels. A notched bracket f is secured to the side of the boiler by a support composed of a vertical rod i and bracket j and on the said bracket is pivoted a lever e to the forward end of which is secured a crank lever g and to the end of this is pivoted the end of a rod h and the free end of this rod is pivotally connected to a forked lever k. The fork of this lever engages with the clutch bowl L and is pivoted to the frame H. A belt pulley E' is secured to the outer end of the shaft I and is driven from the pulley E by a belt.

The operation of the device is as follows: When the engine is started, the shaft C is revolved, and hence the pulley E is revolved and this transmits motion through the belt to the pulley E' and clutch bowl L. It will be thus seen that if the lever e is thrust to the right, the rod h will be drawn backward thus throwing the clutch bowl L over in frictional engagement with the wheel J' and thus the said wheel is revolved, and as the said wheel J' meshes with the wheel T' the said wheel is also revolved and the motion is transmitted by the sprocket wheel and chain to the worm gear Z and through the gear wheel Y to the "take up" drum X, and the chain being connected to the said drum and to the front axle, the front wheels are guided.

Supposing the engine be running to revolve the pulley E in a direction toward the operator, the take up drum will be revolved (by the operation above described) from front to rear and the front wheels will be turned to the right. If the lever e is thrown to the left the reverse operation will be the result. If the lever is kept in a central position as shown in Fig. 3 the clutch is free so that the engine may run without interfering with the steering arrangements. By giving the lever e any pressure in either direction, it will be seen that the clutch may be given any desired frictional contact to accomplish any desired result.

The object of having the plate Q with its lug R adjustable is, that with any construction of engine this device may be placed thereon so that wherever or in whatever angle the lower gearing may be set, the shaft T may be set to engage therewith.

What I claim is—

1. In a steering gear for traction engines, a means for changing direction of movement consisting, essentially, of the oppositely disposed beveled gears, J J', mounted upon the shaft I, and provided on their inner faces with the annular flanges K, K, having their faces turned out to form a cup; the longitudinally movable clutch bowl L, upon such shaft I, and having both ends tapered to fit said cups; a shifting lever connected to said bowl; the interposed gear wheel T, gearing with said beveled gears J J'; the take up drum X, means for imparting rotary motion to said take up drum from the rotary member driven by said gear wheels J, J', and means for imparting rotary motion to said gear wheels J J'; substantially as and for the purposes herein set forth.

2. In a steering gear for traction engines, a means for transmitting and changing direction of movement consisting of the oppositely disposed beveled gears J, J' mounted upon shaft I, and provided on their inner faces with the annular flanges K, K having their inner faces turned out to form a cup, the clutch bowl L mounted upon said shaft I and having either end taper to fit said cups, the said bowl being connected with the said shaft by spline and groove, the shifting mechanism k, connected with the said bowl L, the interposed gear-wheel T', carried upon the shaft T and the sprocket-wheel and sprocket chain connection with take-up drum X and the mechanism for operating the shaft upon which the beveled gears J, J' and clutch bowl L are carried as shown, all substantially as described and set forth.

3. In a steering gear for traction engines, the rectangular frame H, secured to the boiler thereof, and having the semi-circular portion O, O depending therefrom, and having adjustably secured thereto the plate Q, the shaft T, having bearings from said plate Q, the beveled gear wheel T' secured thereto, the beveled gear wheels J, J' provided with annular flanges K, K having their inner faces turned out to form a cup, and engaging with said bevel gear T' intermittently, the friction bowl L, formed with tapering ends, the shaft I, upon which the said friction bowl and bevel gears J, J' are mounted, and suitable mechanism for operating shaft I, and suitable sprocket wheel and sprocket chain connection between shaft T, and take-up drum X, for transmitting motion, all in combination, substantially as and for the purpose set forth.

4. In a steering gear for traction engines, the rectangular frame H, secured to the boiler thereof, and having the semi-circular portion O, O depending therefrom, and having adjustably secured thereto the plate Q, the shaft T, having bearings from said plate Q, the beveled gear wheel T' secured thereto, the beveled gear-wheels J, J' provided with annular flanges K, K having their inner faces turned out to form a cup, and engaging with said bevel gear T', intermittently, the friction bowl L, formed with tapering ends the shaft I, upon which the said friction bowl and bevel gears J, J' are mounted, the shaft C, mounted on the boiler thereof and carrying at one end a pulley E imparting motion by a belt to a pulley E' on the shaft I and suitable mechanism for operating shaft C, and suitable sprocket wheel and sprocket chain connection between shaft T, and take-up drum X for transmitting motion, all substantially as described and for the purpose set forth.

5. In a steering gear for traction engines, the guiding of the engine, by means of power used to propel the engine, consisting of shaft C, mounted on the top of the boiler, and having direct connection at one end thereof with the engine, the opposite end of said shaft being provided with pulley E, the rectangular frame H, secured to the boiler thereof, and having the semi-circular portion O, O depending therefrom, and having adjustably secured thereto the plate Q, the shaft T, having bearings from said plate Q, the beveled gear wheel T' secured thereto, the beveled gear-wheels J, J' provided with annular flanges K, K, having their inner faces turned out to form a cup, and engaging with said bevel gear T' intermittently, the friction bowl L, formed with tapering ends the shaft I, upon which the said friction bowl and bevel gears J, J' are mounted, and suitable mechanism for operating shaft C, and suitable sprocket wheel and sprocket chain connection between shaft T, and take-up drum X for transmitting motion, all substantially as described and for the purpose set forth.

In testimony whereof I affix my signature in presence of two witnesses.

GEORGE W. KRAMER.

Witnesses:
C. JOHNSON,
A. KEITHLEY.